US012312827B2

(12) United States Patent
Otis et al.

(10) Patent No.: US 12,312,827 B2
(45) Date of Patent: May 27, 2025

(54) DOOR ASSEMBLY FOR A SHELTER AND A SHELTER INCLUDING SAME

(71) Applicant: ShelterLogic Corp., Watertown, CT (US)

(72) Inventors: Christian M. Otis, New Haven, CT (US); George A. Bevilacqua, Orange, CT (US); Derald L Shepherd, Torrington, CT (US); Matthew M. DeGennaro, Bristol, CT (US)

(73) Assignee: ShelterLogic Corp., Watertown, CT (US)

( * ) Notice: Subject to any disclaimer, the term of this patent is extended or adjusted under 35 U.S.C. 154(b) by 0 days.

(21) Appl. No.: 17/852,511

(22) Filed: Jun. 29, 2022

(65) Prior Publication Data

US 2023/0003049 A1 Jan. 5, 2023

Related U.S. Application Data

(60) Provisional application No. 63/217,394, filed on Jul. 1, 2021.

(51) Int. Cl.
*E04H 15/58* (2006.01)
*E04H 15/36* (2006.01)
(Continued)

(52) U.S. Cl.
CPC ............... *E04H 15/58* (2013.01); *E06B 9/06* (2013.01); *E06B 9/063* (2013.01); *E06B 9/0676* (2013.01);
(Continued)

(58) Field of Classification Search
CPC .......... E06B 9/06; E06B 9/063; E06B 9/0676; E06B 9/262; E06B 2009/2622; E06B 2003/7044; E06B 2009/587; E04H 6/02
(Continued)

(56) References Cited

U.S. PATENT DOCUMENTS 972,422 A * 10/1910 Whitmore ............. C09B 23/143
160/264
1,788,651 A 1/1931 Alderson
(Continued)

FOREIGN PATENT DOCUMENTS

FR 2860544 A1 * 4/2005 ............. E06B 9/063

*Primary Examiner* — Robert Canfield

(74) *Attorney, Agent, or Firm* — Carmody Torrance Sandak & Hennessey LLP

(57) ABSTRACT

A door assembly for a shelter, wherein the shelter comprises a frame assembly and a cover for covering the frame assembly, wherein the door assembly includes a door frame; a door coupled to the door frame, wherein the door is preferably of a flexible material that can be lifted to provide an opening into the shelter and can be lowered for enclosing the shelter, wherein the door includes a plurality of pockets; a plurality of elongated door members, each of which includes a first and a second end, wherein each of the plurality of elongated door members is positioned within a respective one of the pockets; a plurality of first couplers, each of which couples the first end of a respective elongated door member to a first side of the door frame; a plurality of second couplers, each of which couples the second end of a respective elongated door member to a second side of the door frame; and a door lifting/lowering assembly for lifting the door to provide the opening into the shelter and for lowering the door for enclosing the shelter. Also disclosed herein is a shelter comprising a frame assembly and a cover for covering the frame assembly; and a door assembly as disclosed above.

5 Claims, 3 Drawing Sheets

(51) Int. Cl.
*E06B 9/06* (2006.01)
*E06B 9/262* (2006.01)

(52) U.S. Cl.
CPC ...... *E06B 9/262* (2013.01); *E06B 2009/2622* (2013.01)

(58) Field of Classification Search
USPC .......................................................... 135/117
See application file for complete search history.

(56) References Cited

U.S. PATENT DOCUMENTS

| | | | | | |
|---|---|---|---|---|---|
| 2,688,365 | A | | 9/1954 | Garubo | |
| 3,292,685 | A | * | 12/1966 | Clark | E06B 9/58 160/264 |
| 4,379,478 | A | | 4/1983 | Lichy | |
| 4,397,347 | A | * | 8/1983 | Brabant | E06B 9/0692 160/84.01 |
| 4,880,045 | A | * | 11/1989 | Stahler | E06B 9/327 160/207 |
| 4,896,714 | A | * | 1/1990 | Ellis | E05F 15/47 160/264 |
| 4,938,273 | A | * | 7/1990 | Dubbelman | E06B 9/0692 160/84.02 |
| 5,111,866 | A | * | 5/1992 | Prostko | E06B 9/58 160/90 |
| 5,141,043 | A | * | 8/1992 | Kraeutler | E06B 9/08 160/264 |
| 5,207,256 | A | * | 5/1993 | Kraeutler | E06B 9/063 160/264 |
| 5,219,015 | A | | 6/1993 | Kraeuter | |
| 5,246,053 | A | * | 9/1993 | Kraeutler | F25D 21/04 160/264 |
| 5,275,221 | A | * | 1/1994 | Doehlemann | E06B 9/327 160/84.04 |
| 5,379,823 | A | * | 1/1995 | Kraeutler | E06B 9/0692 160/84.06 |
| 5,988,254 | A | * | 11/1999 | Hanright | E06B 9/262 160/264 |
| 6,116,319 | A | * | 9/2000 | Simon | E06B 9/063 160/264 |
| 6,145,568 | A | * | 11/2000 | Lundstrom | E06B 9/62 160/265 |
| 6,148,895 | A | * | 11/2000 | Biggers | E06B 9/0638 160/183 |
| 6,152,207 | A | * | 11/2000 | Varley | E06B 9/56 160/264 |
| 6,397,916 | B1 | * | 6/2002 | Bengtsson | E06B 9/0692 160/183 |
| RE42,198 | E | | 3/2011 | LaPage et al. | |
| 7,913,711 | B2 | | 3/2011 | Milano, Jr. et al. | |
| 9,366,081 | B2 | * | 6/2016 | Howie | E06B 9/24 |
| D909,280 | S | * | 2/2021 | Thibodeau | D12/401 |
| 11,187,030 | B2 | * | 11/2021 | Wong | E06B 9/17046 |
| 2003/0089461 | A1 | * | 5/2003 | Dondlinger | E06B 9/86 160/84.06 |
| 2004/0020604 | A1 | * | 2/2004 | Allsopp | B32B 7/12 160/84.04 |
| 2006/0243396 | A1 | * | 11/2006 | Liang | E06B 9/324 160/84.06 |
| 2008/0142065 | A1 | * | 6/2008 | Chen | E04H 15/10 135/117 |
| 2010/0018560 | A1 | * | 1/2010 | Milano, Jr. | E04H 15/32 160/369 |
| 2010/0126545 | A1 | * | 5/2010 | Bullivant | E04H 15/36 135/125 |
| 2013/0025802 | A1 | * | 1/2013 | Hamelin | E06B 9/13 160/269 |
| 2015/0211282 | A1 | * | 7/2015 | Potvin | E04H 6/02 135/121 |
| 2017/0350133 | A1 | * | 12/2017 | Chung | E06B 9/0669 |
| 2018/0106070 | A1 | * | 4/2018 | Chen | E06B 9/0692 |
| 2023/0151685 | A1 | * | 5/2023 | Park | E06B 9/38 160/84.03 |
| 2023/0250635 | A1 | * | 8/2023 | McGregor | E06B 9/262 160/327 |
| 2023/0295952 | A1 | * | 9/2023 | Wang | E04H 15/58 160/327 |

* cited by examiner

DOOR ASSEMBLY FOR A SHELTER AND A SHELTER INCLUDING SAME

BACKGROUND OF THE INVENTION

The present invention relates generally to door assemblies for shelter structures and shelter structures including such door assemblies, and in particular, to an improved door assembly and shelter including such a door assembly. In the preferred embodiments, the shelter structure is a stand-alone outdoor structure constructed from a plurality of inter-coupled steel pipes and covered with a flexible material. Preferably the door assembly includes a door frame likewise comprising one or more steel pipes also with a flexible material comprising at least part of the door, and among other things, a novel arrangement for lifting and lowering the door.

Door assemblies for shelter structures are well-known, examples being found in U.S. Pat. Nos. 1,788,651; 2,688,365; 4,379,478; 5,219,015; 6,152,207; and Reissue No. RE42,198. However, such examples are quite different from the door assembly disclosed herein and are not designed nor are contemplated for use with shelter structures of the type disclosed herein. Others have complicated and quite expensive mechanical and/or electrical assemblies for lifting and lowering the door. Others include complicated and heavy door assemblies that would in no way be conducive nor adaptable for a shelter structure of the type disclosed herein.

Others have door assemblies that simply are constructed and operated differently than those disclosed herein. For example, U.S. Pat. No. 7,913,711 describes a shelter of the general type disclosed herein. However, in this prior art construction, the door assembly comprises a retractable door arrangement in which the roll of flexible door material is preferably mounted on a spool so that the door can be extended off of the spool or retracted back onto the spool. A tube motor is described as a preferred means to raise and lower the door.

It is thus believed that the above-referenced examples either have deficiencies, differences and/or were designed with different challenges in mind. In the present invention, the ability to provide a door assembly that achieves all of the advantages provided by the constructions heretofore described, yet additionally is provided with a manual lifting and lowering assembly, while simultaneously is provided with a cost efficient, user-friendly and durable construction, is highly desirable. It is believed that all of the forgoing advantages and additional objectives as disclosed herein are provided by the novel and non-obvious door assembly disclosed herein.

SUMMARY AND OBJECTIVES OF THE PRESENT INVENTION

It is thus an objective of the present invention to overcome the perceived deficiencies in the prior art.

For example, it is an objective of the present invention to provide an improved door assembly for shelter structures and shelter structures including such a door assembly.

It is yet another objective to provide a method of constructing an improved door assembly for shelter structures and shelter structures including such a door assembly that is easy to assemble and is of a user-friendly construction.

Another objective of the present invention to provide an improved door assembly for shelter structures and shelter structures including such a door assembly with a door that can be manually lifted and lowered, thereby being independent of the need of any electrical power.

It is yet another objective of the present invention to provide an improved door assembly for shelter structures and shelter structures including such a door assembly that is durable.

Still a further objective of the present invention is to provide an improved door assembly for shelter structures and shelter structures including such a door assembly that can be opened and closed by a user standing inside the shelter or outside the shelter, thereby providing further versatility and user-convenience to a user of the present invention.

Still further, it is an objective of the present invention to provide an improved door assembly for shelter structures and shelter structures including such a door assembly that provides for improved stability and structural integrity.

It is yet another objective of the present invention to provide an improved door assembly for shelter structures and shelter structures including such a door assembly that allows for relatively quick assembly and disassembly, while at the same time, achieving the other objectives set forth herein.

Yet another objective of the present invention is to provide an improved door assembly for shelter structures and shelter structures including such a door assembly that is both easy to utilize and manufacture and also that achieves all of the advantages and objectives set forth herein.

Further objects and advantages of this invention will become more apparent from a consideration of the drawings and ensuing description.

The invention accordingly comprises the features of construction, combination of elements, arrangement of parts and sequence of steps which will be exemplified in the construction, illustration and description hereinafter set forth, and the scope of the invention will be indicated in the claims.

To overcome the perceived deficiencies in the prior art and to achieve the objects and advantages set forth above and below, the present invention is, generally speaking, directed to a door assembly for a shelter, wherein the shelter comprises a frame assembly and a cover for covering the frame assembly, wherein the door assembly comprises a door frame; a door coupled to the door frame, wherein the door is comprised of a flexible material that can be lifted to provide an opening into the shelter and can be lowered for enclosing the shelter, wherein the door comprises a plurality of pockets; a plurality of elongated door members, each of which includes a first and a second end, wherein each of the plurality of elongated door members is positioned within a respective one of the pockets; a plurality of first couplers, each of which couples the first end of a respective elongated door member to a first side of the door frame; a plurality of second couplers, each of which couples the second end of a respective elongated door member to a second side of the door frame; and a door lifting/lowering assembly for lifting the door to provide the opening into the shelter and for lowering the door for enclosing the shelter.

In yet another preferred embodiment, the present invention is directed to a door assembly for a shelter, wherein the shelter comprises a frame assembly and a cover for covering the frame assembly, wherein the door assembly comprises a door frame; a door coupled to the door frame, wherein the door is comprised of a flexible material that can be lifted to provide an opening into the shelter and can be lowered for enclosing the shelter, wherein the door comprises a plurality of pockets; a plurality of elongated door members, each of which includes a first and a second end, wherein each of the plurality of elongated door members is positioned within a respective one of the pockets; a plurality of first couplers, each of which couples the first end of a respective elongated door member to a first side of the door frame; and a plurality of second couplers, each of which couples the second end of a respective elongated door member to a second side of the door frame.

In still yet another preferred embodiment, the present invention is directed to a door assembly for a shelter, wherein the shelter comprises a frame assembly and a cover for covering the frame assembly, wherein the door assembly comprises a door that is liftable to provide an opening into the shelter and lowerable for enclosing the shelter, and wherein the door is comprised of a flexible material, and wherein the door comprises a plurality of pockets; and wherein the door assembly further comprises a door frame, wherein the door is coupled to the door frame; a plurality of elongated door members, each of which includes a first and a second end, wherein each of the plurality of elongated door members is positioned within a respective one of the pockets; a plurality of first couplers, each of which couples the first end of a respective elongated door member to a first side of the door frame; and a plurality of second couplers, each of which couples the second end of a respective elongated door member to a second side of the door frame.

The present invention is also directed to shelters comprising a frame assembly and a cover for covering the frame assembly; and the door assembly embodiments as disclosed and claimed herein.

The present invention is also directed to a shelter comprising a frame assembly and a cover for covering the frame assembly, and a door assembly as disclosed above.

BRIEF DESCRIPTION OF THE DRAWINGS

The above set forth and other features of the invention are made more apparent in the ensuing Description of the Preferred Embodiments when read in conjunction with the attached Drawings, wherein.

Identical reference numerals in the figures are intended to indicate like parts, although not every feature in every figure may be called out with a reference numeral.

DETAILED DESCRIPTION OF THE PREFERRED EMBODIMENTS

Figure 1:
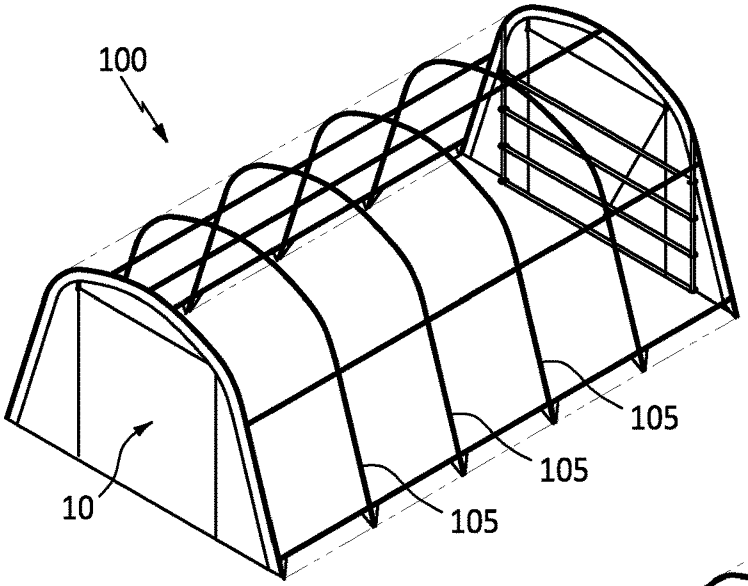
FIG. 1 is a perspective view of a shelter structure comprising a door assembly constructed in accordance with preferred embodiments of the present invention, wherein the door is in a closed position.
Figure 2:
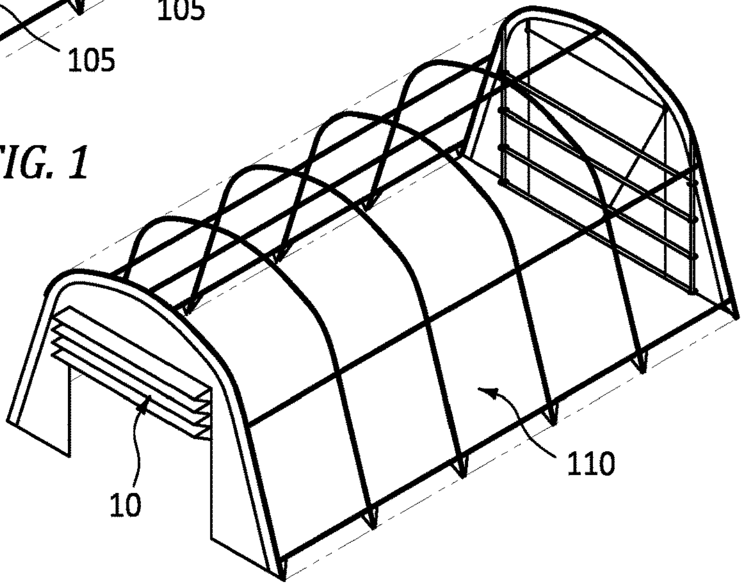
FIG. 2 is a perspective view of the shelter structure and door assembly of FIG. 1, wherein the door is in an open position.

Reference is first made generally to FIGS. 1-2, which discloses a shelter, generally indicated at 100, constructed in accordance with preferred embodiments of the present invention. Shelter 100 preferably includes a frame assembly comprising a plurality of intercoupled and/or interlocking steel pipes 105, and a cover 110 for covering the frame assembly and specifically, the pipes 105. Shelter 100 also includes a door assembly, generally indicated at 10, also constructed in accordance with preferred embodiments of the present invention. As will become clear to those skilled in the art, door assembly 10 of the preferred embodiments herein is believed to be novel and nonobvious over door assemblies in the prior art, and is further particularly adapted for use in a shelter, an example of which is generally indicated at 100. The style, shape and size of the shelter 100 (apart from the door assembly 10) itself is not material to the invention other than fact that the door assembly embodiments as disclosed herein must be constructed to be fitted therefor. Therefore, as should be understood from the following disclosure, the present invention is usable with shelters of many styles, shapes and sizes.

Turning now to certain particulars of preferred embodiments of door assembly 10, reference is thus further made to the remaining figures.

As illustrated, in the preferred embodiment, door assembly 10 comprises a door frame, generally indicated at 15, and a door, generally indicated at 20, which is preferably comprised of a flexible material that can be lifted (e.g. FIG. 5) to provide an opening into the shelter 100 and can be lowered (e.g. FIG. 4) for enclosing the shelter 100.

Figure 4:
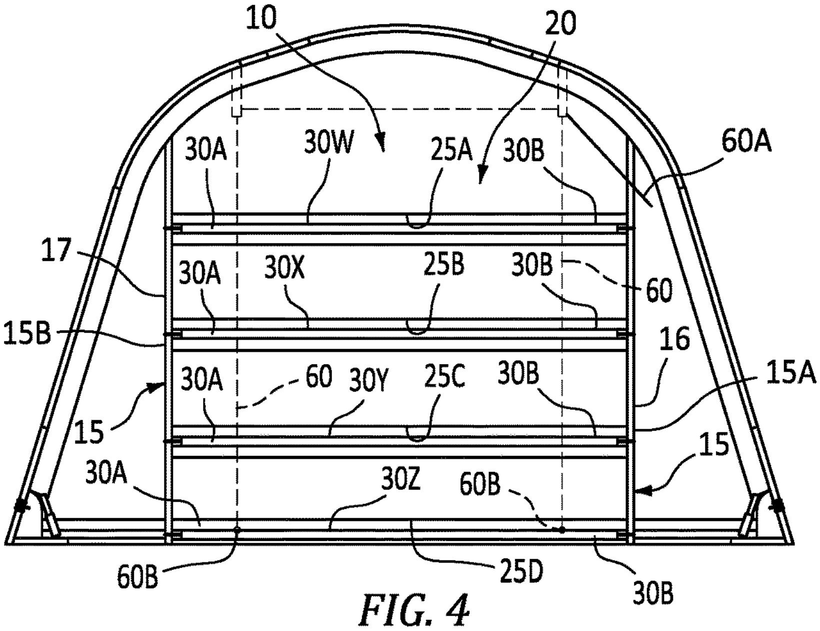
FIG. 4 is a front view illustrating among other things, the door assembly as constructed in accordance with preferred embodiments of the present invention from a view taken from inside the shelter.
Figure 5:
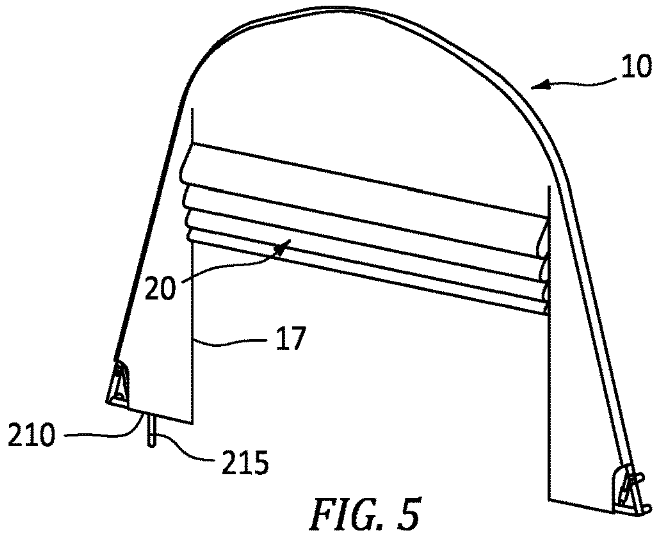
FIG. 5 is a perspective view of the door assembly of FIG. 4, wherein the door is in an open position.
Figure 6:
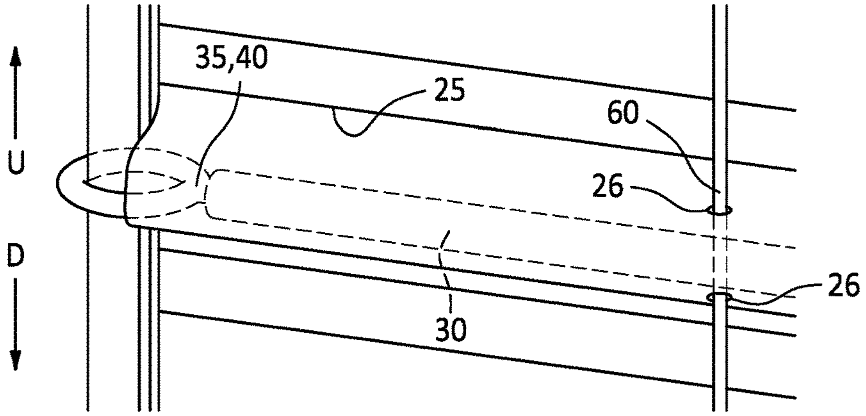
FIGS. 6 and 7 are views illustrating additional features of the door assembly constructed in accordance preferred embodiments of the present invention.

The door assembly 10 preferably comprises a plurality of pockets 25 that are spaced apart from each other (e.g. see FIG. 6) and a plurality of elongated door members 30 (e.g. see FIG. 4 (with particular reference to members 30W, 30X, 30Y, 30Z), 6, and 7), each of which includes a first end 30A and a second end 30B, wherein each of the plurality of elongated door members 30 is positioned within a respective one of the pockets (e.g. FIG. 6). The members 30 assist in lifting and lowering the door 20 and provide integrity, stability, rigidity, and structural support to and for the door 20.

Figure 7:
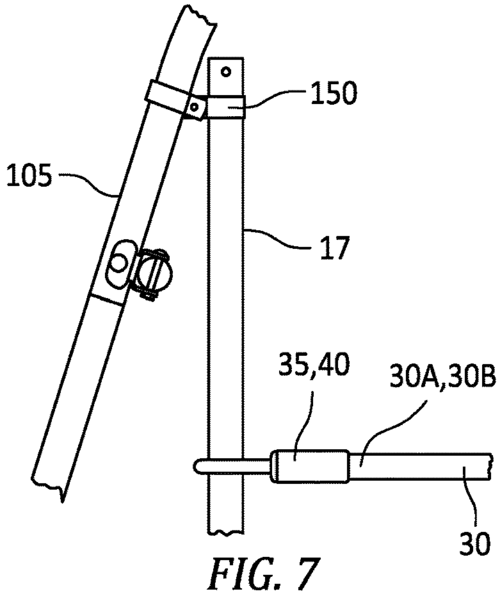

The door assembly 10 also comprises a plurality of first and second couplers 35, 40 as exemplary illustrated in FIGS. 4, 6, 7. Specifically, and as illustrated best in FIG. 4, each of the first couplers 35 couple the first end 30A of a respective elongated door member 30 to a first side 15A of the door frame 15. Similarly, each of the plurality of second couplers 40 couples the second end 30B of a respective elongated door member 30 to a second side 15B of the door frame 15. It should be understood that while FIG. 7 shows only one side of the door frame 15, the references in FIG. 7 are indicated to show reference to the first and second couplers 35, 40 and the corresponding structure. That is, since the construction of the door assembly 10 is the same on the first and second sides 15A, 15B of the door frame 15, it is believed that one figure referencing both sides is both understandable to those skilled in the art and thus sufficient for disclosure purposes.

Figure 8:
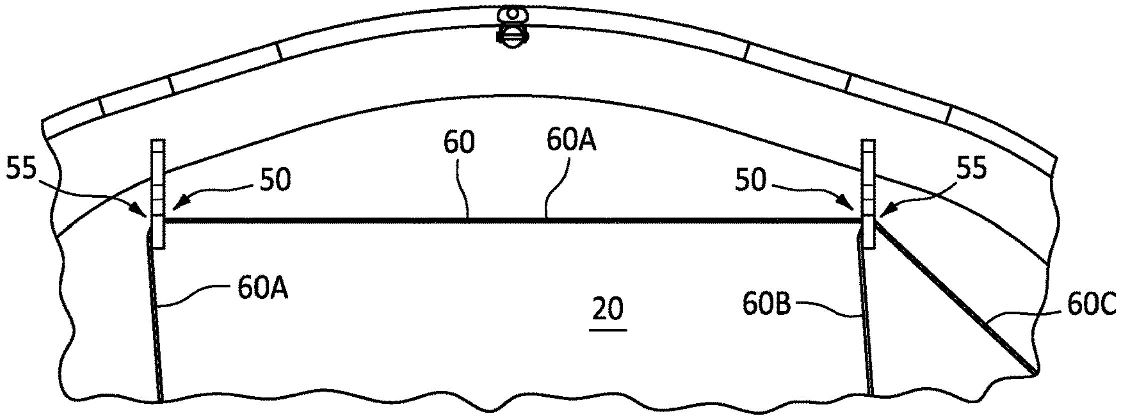
FIG. 8 illustrates yet additional features disclosed herein that assist in and provide for the lifting and lowering of the door.

The figures also illustrate, with reference to FIG. 8 in particular, a door lifting/lowering assembly, generally indicated at 50, for lifting the door 20 to provide the opening into the shelter (e.g. FIGS. 2, 5) and for lowering the door for enclosing the shelter (e.g. FIGS. 1, 4).

Figure 3:
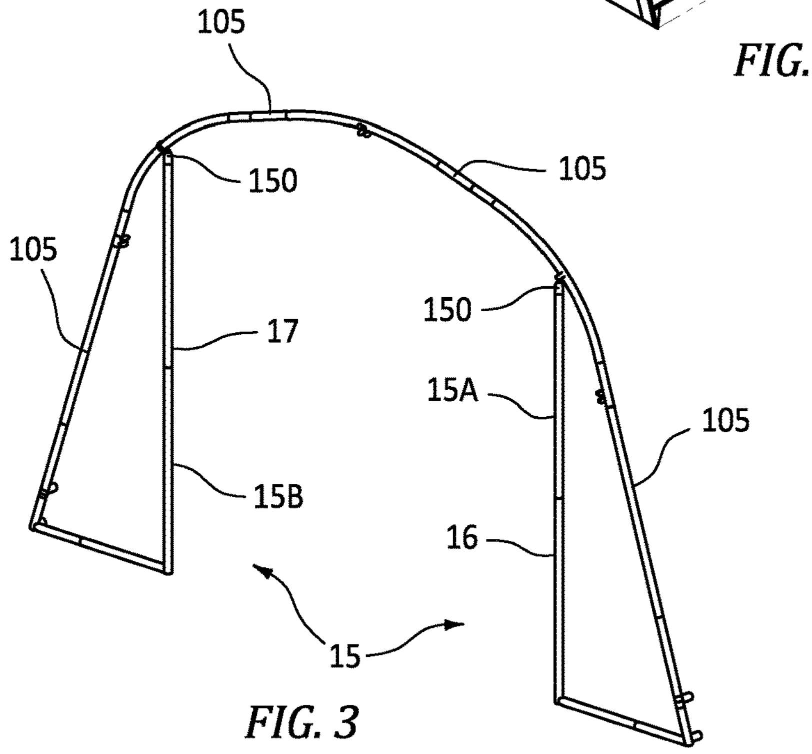
FIG. 3 is a perspective view of a feature of the front of the shelter and door assembly as constructed in accordance with preferred embodiments of the present invention.
Figure 10:
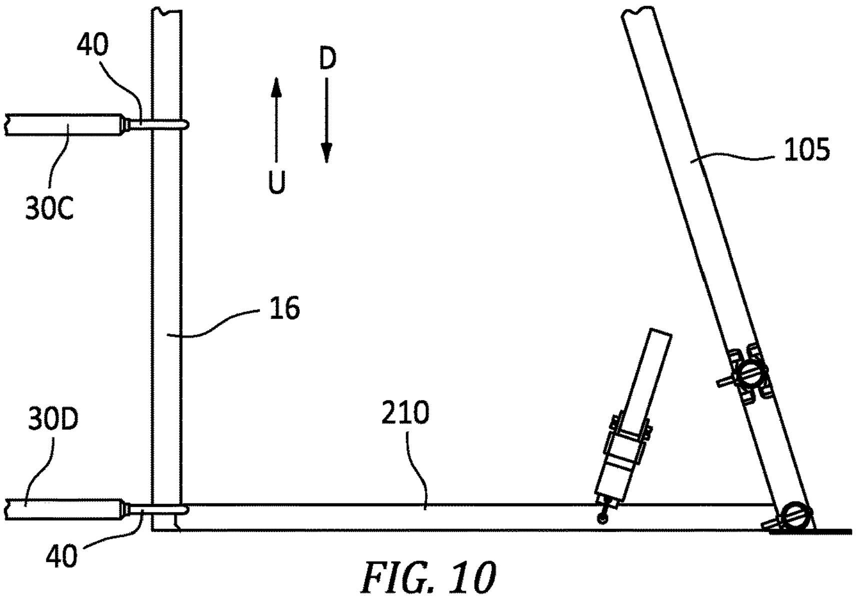
FIG. 10 illustrates still further features of the door assembly constructed in accordance with preferred embodiments of the present invention.

Preferred specifics of the above embodiments and features will now also be provided. For example, FIGS. 3 and 4 illustrates that the right side of the door frame 15A comprises a right side door frame member 16 and that the left side of the door frame 15B comprises a left side door frame member 17. Furthermore, as illustrated for example in FIGS. 6, 10, each of the plurality of first couplers 35 are dimensioned to slide along (see arrows U, D) the right side door frame member 16 and each of the plurality of second couplers 40 are dimensioned to slide along the left side door frame member 17. In a preferred embodiment, each of the ends of the plurality of first couplers 35 and the second couplers 40 are formed into a ring shape to facilitate the sliding of the respective couplers along (e.g. up and down) the respective right and left side door frame members 16, 17. Again, and for the avoidance of doubt, FIGS. 6, 10 show only one side of the door frame 15, but since the features and construction on each side of the door frame are preferably identical, reference numbers to features on each side of the door assembly may be used in the same figure, and thus it is believed that one figure referencing both sides is both understandable to those skilled in the art and thus sufficient for disclosure purposes. For the avoidance of doubt, while "ring" shaped is a preferred shape, other shapes are contemplated such as oval, square, rectangular or the like.

As indicated above, the door lifting/lowering assembly 50 includes door lifting means for (i) pulling the door 20 and/or one of the elongated door members 30 and causing the door 20 to lift to provide the opening into the shelter 100 and (ii) controlling the lowering of the door 20 to enclose the shelter 100. In a preferred embodiment, the door lifting means includes at least one pulley 55 but preferably two (2) pulleys 55 preferably connected or coupled to the door itself as a user may connect or couple the one or more pulleys to holes made in the fabric of the door itself (alternatively, if additional support is needed, the pulleys could be connected, coupled or linked to one of the overhead pipes of the door frame or shelter structure itself), and a length of a rope 60 of at least enough length to span the height of the door and to be reachable and pullable by a user standing on the ground inside or outside the shelter, wherein pulling on the rope 60 causes the pulling of the door 20 and/or one of the elongated door members 30 and causes the door to lift to provide the opening into the shelter and/or controls the lowering of the door to enclose the shelter.

Turning to a particular preferred embodiment, but which should be considered exemplary and not limitation, reference is again made generally to the figures and FIGS. 4 and 6 in particular. As shown in FIG. 4, door 20 is provided with four (4) pockets 25, i.e. pockets 25A, 25B, 25C, 25D. Correspondingly, in such an exemplary embodiment there are and will preferably be four (4) elongated door members 30 (i.e. members 30W, 30X, 30Y, 30Z). In a preferred embodiment, door lifting means provides for the rope 60 to pass through at least the first three (3) spaced apart pockets (i.e. pockets 25A, 25B, 25C) and wherein the terminating end 60B of the rope can be positioned just inside the last/bottom of the pockets 25D such that when pulling on the first end 60A of the rope 60, the rope and the preferably "knotted end" 60B will pull on the last of the pockets (i.e. pocket 25D) and/or the terminating end 60B of the rope can be tied to and/or otherwise coupled to the lowest/bottom elongated door member 30D for lifting the door 20 to provide the opening into the shelter 100 and for controlling the lowering of the door 20 to enclose the shelter.

In such a way, it can be seen that various embodiments that can be constructed from the foregoing disclosure, wherein preferred embodiments of the invention contemplate at least N pockets 25, wherein $N\geq 2$; at least M spaced-apart elongated door members 30, wherein $M\geq 2$; and wherein the rope 60 or other lifting means passes through at least N-1 of the pockets (e.g. pockets 25A, 25B, 25C), and wherein the terminating end 60B of the rope 60 or lifting means (i) pulls the last (e.g. $4^{th}$) pocket (e.g. pocket 25D) and/or (ii) is coupled to the last (e.g. $4^{th}$) elongated door member (e.g. 30D) for lifting the door 20 to provide the opening into the shelter 100 and for controlling the lowering of the door 20 to enclose the shelter 100.

While it is believed that the foregoing disclosure adequately and completely discloses the preferred embodiments of the invention, the following is provided for assurances thereof.

As should now be well understood, the present invention is generally directed to constructions of (and one or more methods of opening) an ingress/egress on a fabric and/or steel structure. The disclosed constructions and methods of opening reduce the force needed to lift the door 20 to its maximum and provides additional structural support to door frame structure of the shelter.

FIGS. 3 and 7 illustrate exemplary coupling arrangements 150 between on the one hand at least some of the intercoupled pipes and on the other hand, the right side door frame member 16 and the left side door frame member 17. Such couplings 150 can be achieved by the use of various types of brackets, preferably made of metal. Preferably, the steel pipes are coupled to the ribs with a bracket and swaged pipe at the bottom.

Figure 9:
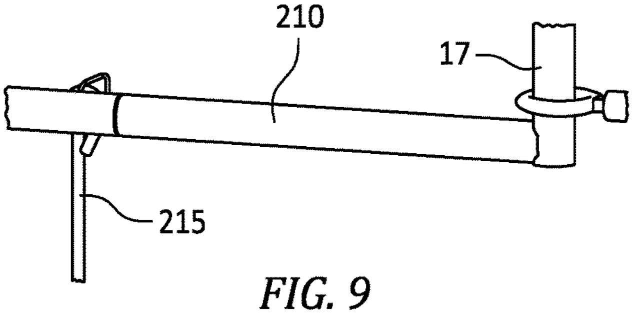
FIG. 9 is a close-up showing a bottom corner of the door assembly, and in particular, a lower corner of the right and left side door frame members.

FIGS. 9, 10 are close-up views showing a bottom corner of the door assembly 10, and in particular, to a lower corner of the right side door frame member 16 (FIG. 10) and left side door frame member 17 (FIG. 9), along with showing one of the floor rails 210 that are positioned along the surface of the ground upon which the shelter 100 is placed, as well as an optional anchor structure 215 (FIG. 9). Specifically, FIG. 10 shows a respective side 16 of the door frame 15, illustrating in particular spaced-apart elongated door members 30C, 30D both coupled to the side door frame 16 by virtue of the couplers 40. It should be understood that FIGS. 9 and 10 represent the constructions of both sides of the door frame and therefore is also deemed to illustrate both the first and second couplers 35, 40 as would be coupled to the door frame members 16, 17 and able to slide up and down thereon. Additional locking and supporting brackets and tightening assemblies are provided as would be understood in the art.

Preferably, the elongated door members 30 are made of PVC material.

As disclosed above, the door lifting means preferably comprises at least one pully and the rope 60. However, it should be understood that more than one pulley may be implemented, wherein the lifting means may comprise at least two (2) pulleys 55, and wherein the rope 60 preferably would run through holes (e.g. holes 26, FIG. 6) in the preferably welded pockets 25 and run behind the PVC elongated door members 30 and terminate in the last pocket 25D and/or around the last of the elongated members 30D nearest the floor. An additional hole (not shown) may be provided at the top of the door to allow the rope 60 to run to the outside of the shelter 100 so it can be pulled and/or released by a person positioned outside of the shelter 100.

The spacing between the PVC pipes determines the length of the sag of the fabric door 20 as it is pulled up. In an exemplary and preferred embodiment, the shelter 100 is a 13'×20'×9' structure, with the 9' height being sufficient to allow most SUVs, vans and/or trucks to fit within the shelter 100. In such an example, the side zipper height on each side of the door 20 is preferably about 84", the door will be "bunched up" to about 10" in length of the door entry height, and the door opening is thus preferably about 74".

The present invention can also be constructed in many styles, such as by way of example and not limitation, "peak," "round," and/or "arch" and the sizes of such shelters are also numerous, including but not limited to 11'×20'×8'; 12'×20'×8'; 10'×20'×8'; 10'×12'×8.5'; 12'×24'×9'; 13'×20'×12'; 13'×20'×10'; and/or 14'×32'×12', just to name a few.

It should also be understood that feet and/or other supporting structure may be provided to the shelter 100 for providing support, lateral or otherwise, for the door assembly. Bolts/nuts, brackets and/or welding are the preferred means of coupling pipes and other structures together, but other equally acceptable and adequate means are known and could be employed as would be understood in the art. For the avoidance of doubt, the right and left sides of the door frame are preferably identically constructed.

As should now also be understood, various modifications and reinforcements can be made to the invention without departing from the scope thereof. For example, members 30 are preferably steel or PVC although the use of other materials are within the scope of the invention. The spaced apart pockets 25 are preferably welded as would be understood in the art, and are preferably at 19" high intervals on the door itself. In this way, the pocket height is preferably established to minimize the fabric sag of the door 20 as it is pulled up between one pocket and another. In addition, the pockets 25 provide for the elongated door members 30 to slide in from one end to another, acting as a rigid member to help with guiding the door vertically. Preferably, the elongated door members 30 can freely slide in the pockets 25 and fasteners or other locking means are not needed to maintain the members 30 within the pockets 25 by virtue of the unique implementation of couplers 35, 40 at the ends thereof. That is, positioned at each of the respective ends of the elongated door members 30 are the aforementioned couplers 35, 40, which are preferably plastic caps with loops/rings on the ends as shown in the figures, where the loops/rings act as a guide to the door opening frame. The loops/rings on the couplers 35, 40 may be rigid, or the loop/ring can be designed to rotate, allowing for easier functioning of the door. It should be understood that the terms "loop" and "ring" are meant to mean the same thing in this disclosure and can be used interchangeably herein without imparting any difference in structure or function therebetween.

The door lifting means preferably comprises one or more pulleys and/or one or more ropes on each side of the door 20 as illustrated in FIG. 4, with the ends of the rope(s) terminating for example in or at the pocket 25D and/or to and/or around the member 30 within the pocket 25D closest to the ground. However, these door lifting means are only by example and not limitation, as other structures, alone or in combination, can be used, such as string, cord, and/or a chain (linked or otherwise) made of metal, plastic or the like. And, while pulleys are preferred, other additional or substitute components may be used, such as by example and not limitation, loops, rings and/or other eyelet structures.

Preferably, the rope, string or other lifting means 60 is arranged to go through each pocket 25 through a hole behind the respective member 30 within the pocket 25, although it is also contemplated that the lifting means 60 could go through each respective member 30. Preferably, the lifting means 60 go through the pulleys 55 at the top of the door assembly 10, then through a grommet (not shown) for guiding the rope, cord, string, chain or the like to the outside when the pulleys are on the inside of the shelter of course understanding that a reverse configuration and/or modifications thereto are within the scope of the invention.

Preferably, there are two sections of rope, string or the like as indicated in FIG. 8 wherein a first section of rope is indicated by reference 60A, a second section of rope is indicated at section 60B and the two sections of rope are joined, e.g. by a knot, tie and/or otherwise to a third section of rope 60C so that pulling on section 60C lifts both sides of the door 20 simultaneously and at the same rate. In this way, the lifting means 60 (e.g. rope or otherwise) can be pulled and/or released by a person as discussed above. In this way, the means for pulling (e.g. the rope, string, chain, cord or the like) the door upwardly (i.e. away from the ground on which the shelter is positioned) provides an opening into the shelter and for lowering the door for enclosing the shelter.

To be sure however, the positioning of the pulleys, grommets and/or rope (or other means as disclosed herein) can be provided such that the lifting/lowering of the door is designed to be effectuated from inside the shelter 100, as this is simply a design choice as to where to position such components. To secure the door when down, zippers (not shown) may be provided on each side of the door, but other options, such as Velcro, snaps, buttons or the like are also contemplated herein.

As would be known in the art and to the extent not dictated by function but rather by design constraints, combinations of metal, steel and/or plastic pieces may be used for the components disclosed herein. Preferably, however, all tubing is made of steel.

To this end, it can be seen that a method of constructing a door assembly for shelter structures and shelter structures including such a door assembly is provided.

It should also be understood that unless otherwise specified, the terms "coupled" or "connected" (or grammatical forms of each) may be used interchangeably herein and each and both and all of such terms and forms thereof are intended to mean and cover embodiments having a direct connection and/or connected through one or more intermediate members/structures or the like.

It will thus be seen that the objects set forth above, among those made apparent from the preceding description, are efficiently attained and, since certain changes may be made in the above constructions without departing from the spirit and scope of the invention, it is intended that all matter contained in the above description or shown in the accompanying drawings shall be interpreted as illustrative and not in a limiting sense.

It should also be understood that the following claims are intended to cover all of the generic and specific features of the invention described herein and all statements of the scope of the invention that as a matter of language might fall there between.

What is claimed is:

1. A door assembly for a shelter, wherein the shelter comprises a frame assembly and a cover for covering the frame assembly, wherein the door assembly comprises:

a door frame;

a door coupled to the door frame, wherein the door is comprised of a flexible material that can be lifted to provide an opening into the shelter and can be lowered for enclosing the shelter, wherein the door comprises a plurality of pockets;

a plurality of elongated door members, each of which includes a first and a second end, wherein each of the plurality of elongated door members is positioned within a respective one of the pockets;

a plurality of first couplers, each of which couples the first end of a respective elongated door member to a first side of the door frame;

a plurality of second couplers, each of which couples the second end of a respective elongated door member to a second side of the door frame; and door lifting means for (i) pulling at least one of the door or one of the elongated door members and causing the door to lift to provide the opening into the shelter and (ii) controlling the lowering of the door to enclose the shelter; and wherein:

there are at least N pockets, wherein N≥2;

there are at least M spaced-apart elongated door members, wherein M≥2; and the door lifting means has at least a first end, wherein the door lifting means passes through at least N-1 of the pockets, and wherein the door lifting means has a terminating end that at least one of (i) pulls the Nth pocket or (ii) is coupled to the Mth elongated door member for lifting the door to provide the opening into the shelter and for controlling the lowering of the door to enclose the shelter.

2. The door assembly as claimed in claim 1, wherein:

the first side of the door frame comprises a right side door frame member;

the second side of the door frame comprises a left side door frame member;

each of the plurality of first couplers are dimensioned to slide along the right side door frame member; and each of the plurality of second couplers are dimensioned to slide along the left side door frame member.

3. The door assembly as claimed in claim 1, wherein the door lifting means includes at least one of a rope, a cord, a string, or a chain;

wherein pulling on the at least one of the rope, string, cord, or chain pulls at least one of the door or one of the elongated door members causing at least one of the door to lift to provide the opening into the shelter or the controlling of the lowering of the door to enclose the shelter.

4. A shelter comprising:

a frame assembly and a cover for covering the frame assembly; and a door assembly as claimed in claim 1.

5. The door assembly as claimed in claim 1, wherein the door lifting means comprises at least one pulley coupled to the door or the door frame of the door.

* * * * *